(12) United States Patent
Galbraith et al.

(10) Patent No.: US 9,548,911 B2
(45) Date of Patent: Jan. 17, 2017

(54) NETWORK ARRANGEMENT OF LOW POWERED MONITORING DEVICES

(75) Inventors: Colin Galbraith, Stolford (GB); Mike O'Connell, Weston-super-Mare (GB)

(73) Assignee: TEXECOM LIMITED, Haslingden, Lancashire (GB)

( * ) Notice: Subject to any disclaimer, the term of this patent is extended or adjusted under 35 U.S.C. 154(b) by 643 days.

(21) Appl. No.: 13/383,532

(22) PCT Filed: Jan. 28, 2010

(86) PCT No.: PCT/EP2010/051014
§ 371 (c)(1),
(2), (4) Date: Aug. 1, 2012

(87) PCT Pub. No.: WO2011/009646
PCT Pub. Date: Jan. 27, 2011

(65) Prior Publication Data
US 2013/0212254 A1    Aug. 15, 2013

(30) Foreign Application Priority Data

Jul. 22, 2009    (GB) .................................. 0912737.4

(51) Int. Cl.
G06F 15/173    (2006.01)
H04L 12/26    (2006.01)
(Continued)

(52) U.S. Cl.
CPC ........... *H04L 43/0805* (2013.01); *H04L 12/12* (2013.01); *H04L 27/2657* (2013.01);
(Continued)

(58) Field of Classification Search
CPC .... H04L 29/08072; H04L 29/06; H04L 45/12;
H04L 45/20; H04L 27/2657; H04L 27/2662; H04L 12/12; H04L 43/0805; H04W 74/0841; H04W 52/0216
(Continued)

(56) References Cited

U.S. PATENT DOCUMENTS

2004/0125753 A1 *   7/2004   Mahany ................ H04L 1/0002
                                              370/254
2006/0285579 A1 *  12/2006   Rhee et al. .................... 375/132
(Continued)

FOREIGN PATENT DOCUMENTS

| EP | 1933507 A1 | 6/2008 |
|---|---|---|
| WO | WO 2006068370 A1 * | 6/2006 |
| WO | WO 2009018212 A1 * | 2/2009 |

OTHER PUBLICATIONS

Schurgers, C., Tsiatsis, V., Ganeriwal, S., and Srivastava, M., "Topology Management for Sensor Networks: Exploiting Latency and Density"MOBIHOC 2002, Proceedgs of the 3rd. ACM International Symposium on Mobile Ad Hoc Networking and Computing, Lausanne, Switzerland, Jun. 9, 20020609 New York, NY: ACM, US LNKD-DOI: 10.1145/513800, 513817, Jun. 9, 2002 (Jun. 9, 2002_pp. 135-145, XP001171557.

*Primary Examiner* — Chris Parry
*Assistant Examiner* — Weiwei Stiltner
(74) *Attorney, Agent, or Firm* — Barlow, Josephs & Holmes, Ltd.

(57) ABSTRACT

A network arrangement of low powered monitored devices which are linked together along with a control device in a mesh network configuration. Each of the security devices and the control devices are powered by an on board power source. To maximize the lifetime of the of the power supply the devices are monitored periodically and synchronously, and the devices are only activated during monitoring.

8 Claims, 1 Drawing Sheet

(51) Int. Cl.

| | |
|---|---|
| *H04L 12/721* | (2013.01) |
| *H04W 74/08* | (2009.01) |
| *H04L 29/08* | (2006.01) |
| *H04L 27/26* | (2006.01) |
| *H04L 12/733* | (2013.01) |
| *H04L 29/06* | (2006.01) |
| *H04L 12/12* | (2006.01) |
| *H04W 52/02* | (2009.01) |
| *H04W 84/18* | (2009.01) |

(52) U.S. Cl.
CPC .......... *H04L 27/2662* (2013.01); *H04L 29/06* (2013.01); *H04L 29/08072* (2013.01); *H04L 45/12* (2013.01); *H04L 45/20* (2013.01); *H04W 52/0216* (2013.01); *H04W 74/0841* (2013.01); *H04W 84/18* (2013.01)

(58) Field of Classification Search
USPC ........................................................ 709/224
See application file for complete search history.

(56) References Cited

U.S. PATENT DOCUMENTS

| | | | |
|---|---|---|---|
| 2007/0233835 A1* | 10/2007 | Kushalnagar | H04L 12/12 709/223 |
| 2008/0049700 A1* | 2/2008 | Shah | G01D 21/00 370/342 |
| 2008/0186871 A1* | 8/2008 | Trevino | G01D 4/004 370/252 |
| 2009/0047927 A1 | 2/2009 | Weiler | |
| 2009/0092115 A1* | 4/2009 | Zuniga | 370/338 |
| 2009/0147714 A1* | 6/2009 | Jain | H04W 52/0216 370/311 |
| 2009/0323716 A1* | 12/2009 | Chintalapudi | H04W 74/0841 370/461 |
| 2010/0177708 A1* | 7/2010 | Pandey | H04W 74/0883 370/329 |
| 2010/0322244 A1* | 12/2010 | Dasylva et al. | 370/390 |
| 2011/0002251 A1* | 1/2011 | Shin | H04J 3/0679 370/311 |

* cited by examiner

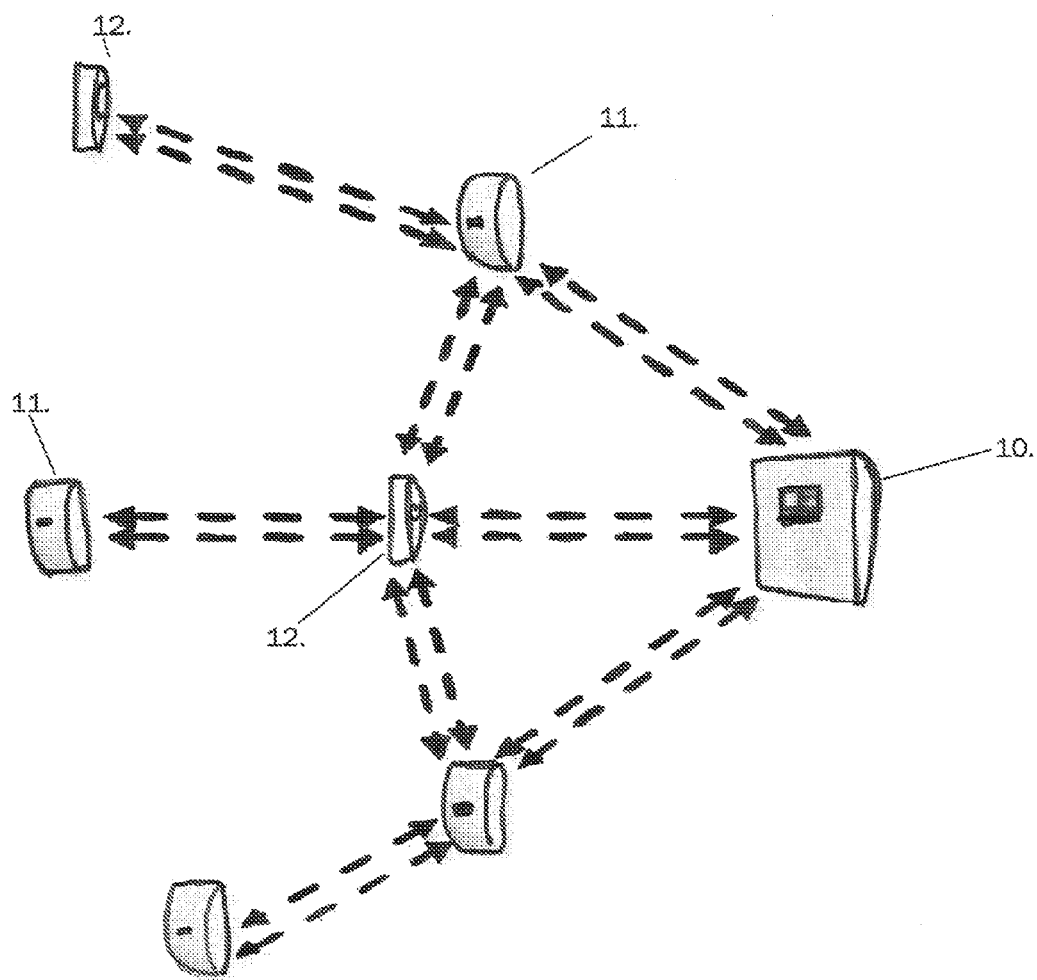

NETWORK ARRANGEMENT OF LOW POWERED MONITORING DEVICES

CROSS-REFERENCE TO RELATED APPLICATIONS

This patent document is a national phase application filed pursuant to 35 U.S.C. §371 of PCT International Application No. PCT/EP2010/051014, filed on Jan. 28, 2010, which claims priority to earlier filed British Patent Application No. 0912737.4, filed on Jul. 22, 2009.

BACKGROUND OF THE INVENTION

1. Field of the Invention

This invention relates to low powered monitored devices arranged in a configuration commonly referred to as a mesh network.

2. Background of the Related Art

Mesh Networks are networks in which data of various kinds can be routed between nodes. The advantageous feature of a mesh network is that it allows connections between nodes to be made even when direct paths between the nodes are broken by allowing hopping around the nodes until the required node is reached. Mesh Networks are generally very reliable and are widely used in connection with Information Technology (IT) applications, particularly in wireless form.

Hitherto, it has not been thought possible to link monitored devices in a mesh network configuration due to the fact that such devices are required to operate on power drawn from an on board power supply. Due to the power requirements of such devices, it has been thought that use in a mesh network configuration would lead to an unacceptably short life of the on board power supply where there is the need for constant monitoring of the devices in the network.

SUMMARY OF THE INVENTION

The present applicants have realised that it is possible to overcome the above mentioned difficulties and to allow low powered monitored devices to be used in a mesh network type configuration.

Accordingly it is an object of the present invention to provide a network of low powered monitored devices, in a mesh network configuration, which overcomes or at least minimises the problems identified above with the use of such a network configuration for devices of this type.

Thus and in accordance with the present invention there is provided a network arrangement of low powered monitored devices operable to communicate with a control device, each said device being operable to switch between two states, an activated state in which said device can communicate with the control device and in which the requirements for power are relatively large, and a deactivated state where the device is not able to communicate and where the requirements for power are relatively small, said devices being switched between said states for monitoring at a predetermined frequency each said device being switched between said states in synchronisation with each other.

With the above arrangement it is possible for low powered monitored devices to be used in a mesh type network arrangement and to obviate the difficulties and problems associated with the use of such devices in such a network configuration.

Preferably the devices and control device are linked by one or more wireless connections.

Preferably the monitored devices are switched between said states for communication with said control device at a frequency substantially of the order of once every 0.5 seconds. Most advantageously, the devices are switched at a predetermined rate but the devices are arranged to remain in said activated state for only a predetermined part of said period, typically of the order of 18 ms.

The monitored devices can take any form, as desired or as appropriate. By way of example only, the devices can comprise security devices, access control devices, fire detectors or any other devices which are low powered in operation and which are required to be monitored regularly.

The monitored devices are powered by an on board power supply, preferably in the form of a battery which may be rechargeable or otherwise replaceable.

BRIEF DESCRIPTION OF THE DRAWINGS

The invention will now be described further by way of example only and with reference to the following drawings, the single FIGURE of which shows a diagrammatic representation of one embodiment of a mesh network incorporating low powered monitored devices in accordance with the present invention.

DETAILED DESCRIPTION OF THE PREFERRED EMBODIMENT

Referring now to the FIGURE, there is shown one embodiment of mesh network comprising a control device 10 linked by wireless connection to a plurality of security devices 11. By security devices 11 is meant any device which is capable of providing an indication of a feature or state of such a device and communicating this to a control device. Non limiting examples of such devices are electronic security devices, access control devices and fire detection devices.

Each of the security devices 11 connected to the network can transmit data to, and receive data from, a control device 10 (one embodiment being the control panel of a building alarm system). By connecting the control device 10 to each of the devices 11 by a mesh network, if one of the devices 11 fails, or the connection to it fails, this has no effect on other devices 11 in the system, or their ability to communicate. In such circumstances, since data is fed via other operational nodes to its intended destination, this allows a mesh network of the type of the present invention to continue to operate, when other networks without such an arrangement might fail.

Each of the security devices 11 forming the network is, when the network is operational, normally in a continuous sleep or deactivated mode during which power consumption by each device is minimal. In order to communicate with the control device 10 or another device 11 on the network, the control device operable to switch the device to its activated or wake up state once every 0.5 seconds. In the activated state, power consumption is relatively high and therefore it is desirable to have the respective devices 11 in this state for as little time as possible to preserve battery power and allow a much longer battery life. This is achieved, in the present embodiment, by switching the individual devices or groups thereof on and off at the frequency mentioned above to reduce the amount of battery power required when the network is operational. In fact, to reduce the power requirements still further, the devices are arranged to be activated only for a small part of the 0.5 seconds period and are typically activated for a period of 18 ms only.

In order to make the reduction of consumption of battery power to prolong the life of the batteries, all of the devices 11 are activated in a synchronised manner to allow monitoring of each device 11 by the control device to take place simultaneously.

During the activated state, the control device 10 can communicate with each of the devices, and the devices 11 can also communicate with each other, and can transfer data, software updates or any other data as desired or as appropriate, between them. With the arrangement described herein, it will be appreciated that the power supply to the devices will have a much greater and commercially attractive lifetime.

In summary therefore, it will be appreciated that the fact that all, or at least the majority, of the devices forming the mesh network are monitored regularly and are therefore in the activated state for the minimum amount of time. The use of a system in which the activated state is used for the length of time required to download or upload data. It has been found that a frequency of approximately 0.5 seconds is suitable for the present embodiment but of course any short timeframe may be appropriate for other embodiments this means that the lifetime of the on board power source is maximised thereby overcoming the problem mentioned above with known arrangements.

It is of course to be understood that the invention is not intended to be restricted to the details of the above embodiment which are described by way of example only.

The invention claimed is:

1. A network arrangement, comprising:
a plurality of low powered monitored devices; and
a single, distinct control device;
wherein said monitored devices are operable to communicate with said control device, each said device being closer to the control device than the preceding device and wherein each said device includes a memory device in which is stored data relating to the relative position of the device in said network arrangement to other devices of said network, to allow said devices to communicate signals to the control device over a maximum distance using a minimum number of devices, thus reducing power requirements of said network arrangement;
wherein each device is operable to switch between two states, an activated state in which said device can communicate with the control device and/or another of said devices and in which the requirements for power are large and a de-activated state where the device is not able to communicate with the control device and/or other of said devices where the power requirements are small;
wherein said devices are switched between said states at a predetermined rate and said switching between states is carried out in synchronization with all devices; and
wherein the control device sets the predetermined rate and synchronizes the devices with each other.

2. The network arrangement according to claim 1 wherein said devices and control device are linked by one or more wireless connections.

3. The network arrangement according to claim 1 wherein switching between the activated and deactivated states is at a frequency of once every 0.5 seconds.

4. The network arrangement according to claim 1 wherein switching between the activated and deactivated states is at a predetermined periodic rate and the monitored devices remain in said state for only a part of said period.

5. A network arrangement, comprising:
a plurality of low powered monitored devices; and
a single, distinct control device;
wherein said monitored devices are operable to communicate with said control device, each device being operable to switch between two states, an activated state in which said device can communicate with the control device and/or another of said devices and in which the requirements for power are large and a deactivated state where the device is not able to communicate with the control device and/or other of said devices where the power requirements are small, said devices being switched between said states is carried out in synchronization with all devices with each other and wherein a device sends out a signal, said signal is detected by other devices and said other devices act to direct the signal detected to other said device, each said device being closer to the control device than the preceding device and where each said device includes a memory device in which is stored data relating to the relative position of the device in said network arrangement to other devices of said network, to allow said devices to communicate signals to the control device over a maximum distance using a minimum number of devices, thus reducing power requirements of said network arrangement; and
wherein the control device sets a rate at which the control devices are switched between said states and synchronizes the devices with each other.

6. The network arrangement according to claim 5 wherein said devices and control device are linked by one or more wireless connections.

7. The network arrangement according to claim 5 wherein switching between the activated and deactivated states at a frequency of once every 0.5 seconds.

8. The network arrangement according to claim 5 wherein switching between the activated and deactivated states is at a predetermined periodic rate and the monitored devices remain in said state for only a part of said period.

* * * * *